United States Patent

Betts et al.

[11] Patent Number: 5,930,441
[45] Date of Patent: Jul. 27, 1999

[54] SPLIT-BEAM FOURIER FILTER

[75] Inventors: Ralph Alexander Betts, Randwick; Steven James Frisken, Maroubra; Danny Wai-Boon Wong, Randwick, all of Australia

[73] Assignee: Phontonic Technologies Pty Ltd, New South Wales, Australia

[21] Appl. No.: 08/793,729

[22] PCT Filed: Aug. 30, 1995

[86] PCT No.: PCT/AU95/00551

§ 371 Date: May 2, 1997

§ 102(e) Date: May 2, 1997

[87] PCT Pub. No.: WO96/07114

PCT Pub. Date: Mar. 7, 1996

[51] Int. Cl.[6] .................................................. G02B 6/26
[52] U.S. Cl. ............................................. 385/140; 385/25
[58] Field of Search ............................. 389/889; 385/35, 385/34, 33, 73, 74, 25, 140

[56] References Cited

U.S. PATENT DOCUMENTS

| | | | |
|---|---|---|---|
| 4,989,938 | 2/1991 | Tamulevich | 350/96.15 |
| 5,276,747 | 1/1994 | Pan | 385/34 |
| 5,781,341 | 7/1998 | Lee | 359/578 |

FOREIGN PATENT DOCUMENTS

| | | |
|---|---|---|
| 75178/91 | 10/1991 | Australia . |
| 0 074 144 | 3/1983 | European Pat. Off. . |
| 0 098 730 | 1/1984 | European Pat. Off. . |
| 0 343 489 | 11/1989 | European Pat. Off. . |

OTHER PUBLICATIONS

Kawachi et al., "Planar lightwave circuits for optical signal processing," Conference on Optical Fiber Comm. 1994; OSA, Washington, D.C. 1994; FB3, pp. 281–282.

Mollenauer et al., "Demonstration, using sliding–frequency guiding filters, of error–free soliton transmission over more than 20,000 km at 10 Gbit/s, single–channel and over more than 13,000 km at 20 Gbit/s in a two–channel WDM," Conference on Optical Fiber Comm. 1993; OSA, Washington, D.C. 1994: Paper PD8, pp. 37–40.

Poole et al., "Elliptical–Core Dual–Mode Fiber Dispersion Compensator," *IEEE Photonics Technology Letters*, vol. 5, No. 2, Feb. 1993, pp. 194–197.

*Primary Examiner*—Hung N. Ngo
*Attorney, Agent, or Firm*—Marshall, O'Toole, Gerstein, Murray & Borun

[57] ABSTRACT

An optical filter, comprising a first optical waveguide, a second optical waveguide and means for expanding light from the first optical waveguide into a beam, and at least one optical flat inserted partially into the beam so that a fraction of the light passes through each optical flat and a means for focussing the light into the second optical waveguide. In its simplest form the device has a Mach-Zehnder (sinusoidal) transmission characteristic. The filter can be tuned both in wavelength and extinction either mechanically or electrically. More complex (non-sinusoidal) characteristic can also be obtained.

24 Claims, 4 Drawing Sheets

SPLIT-BEAM FOURIER FILTER

TECHNICAL FIELD

This invention relates to optical filtering, to means and methods for producing the filtering and to devices using such means and methods. In particular, this invention relates to optical filtering of light guided by optical waveguides such as optical fibre.

BACKGROUND ART

Many different types of filter have been demonstrated. These include various types of absorption filtering, dielectric single or multilayer filtering, interferometric filtering (Fabry-Perot, Michelson, Mach-Zehnder, Sagnac etc) and grating filtering.

A conventional (prior art) Mach-Zehnder filter consists of a beam splitter (or coupler) which splits the input light into two paths and a beam combiner (or coupler) to combine the light again. If the two paths have different lengths, the Mach-Zehnder filter has a wavelength dependent transmission characteristic.

The split-beam Fourier filter (SBFF) described in this document is a special type of filter which can give the same characteristic transmission as a Mach-Zehnder filter as well as more complex characteristics by simply splitting the beam of a fibre beam expander with an appropriate transparent element or elements so that different parts of the beam travel different optical path lengths. This gives highly stable performance and is ideally suited to incorporation in a single mode fibre beam expander.

PRINCIPLE OF OPERATION

The split-beam Fourier filter consists of a number of plates of glass appropriately positioned in a fibre beam expander. In the case of one plate of glass (single element) in one beam expander (single stage), the wavelength characteristic is that of a Mach-Zehnder filter—sinusoidal with a wavelength period dependent on the thickness of the glass plate. Excellent loss and extinction have been obtained, and mechanical tuning of the characteristic (both wavelength and extinction) is straightforward. The use of multiple elements allows more complex filter characteristics.

FIG. 1 shows the elements comprising a single stage split-beam Fourier filter. The filter is a flat plate of glass (1) with one edge (2) carefully polished perpendicular to the plate surface this edge splits the beam of a fibre beam expander. Light passing through the plate will experience a wavelength dependent phase shift compared with the light that does not pass through the plate. If the phase shift is zero or a multiple of $2\pi$, then the beam is unchanged and the transmission is maximum (100%). If the phase shift is $\pi$, then the E field is inverted in one half of the beam compared to the other, giving an antisymmetric E field distribution in the beam. The result at the output fibre tip is an E field distribution which is the two dimensional Fourier transform of the beam E field which is also an antisymmetric function. The overlap of this distribution with the fundamental fibre mode is zero therefore no light will be launched into the fibre if the fibre is single mode. Analysis shows that the transmission, T is given by:

$$T = 1 - s \sin^2(\Delta\phi/2) \qquad (1)$$

where $\Delta\phi = 2\pi(n-1)L/\lambda$ is the phase difference, n is the refractive index and L is the thickness of the glass plate, $\lambda$ is the wavelength and s is the suppression of extinction which depends on the fraction of the beam passing through the plate (when the plate exactly bisects the beam, s=1).

DETAILED DESCRIPTION

Figure 1:
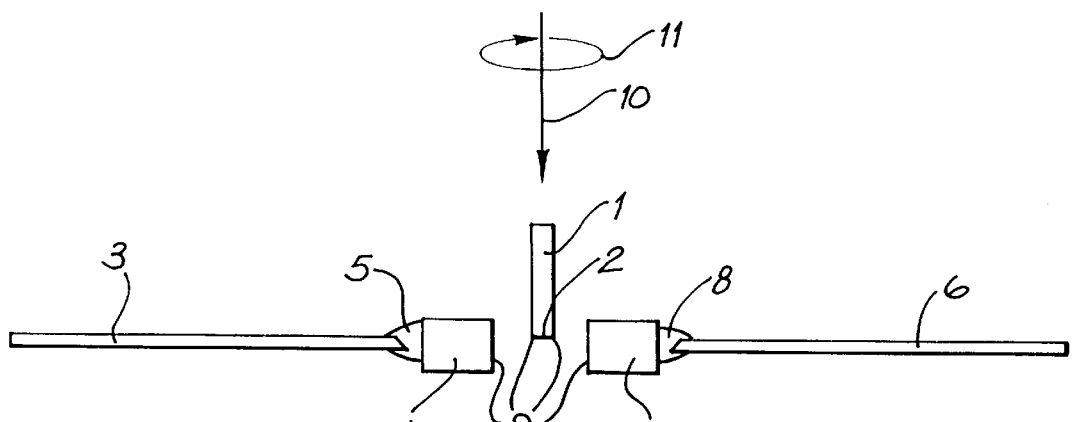
FIG. 1 is a schematic view of a single element, single stage, split-beam Fourier filter.

FIG. 1 shows the elements comprising one embodiment of a single stage split-beam Fourier filter. The filter is a flat plate of glass (1) with one edge (2) carefully polished perpendicular to the plate surface—this edge splits the beam of a fibre beam expander consisting of a first fibre (3) glued to a lens (4) with transparent glue (5) and a second fibre (6), lens (7) and glue (8). Anti-reflection coatings (9) on the lenses and plate improve transmission and suppress cavity resonances.

Light passing through the plate experiences a wavelength dependent phase shift compared with the light that does not pass through the plate. If the phase shift is zero or a multiple of $2\pi$, then the beam is unchanged and the transmission is maximum (100%). If the phase shift is $\pi$, then the electric field (E field) is inverted in one half of the beam compared to the other, giving an antisymmetric E field distribution in the beam. The result at the output fibre tip is an E field distribution which is the two dimensional Fourier transform of the beam E field which is also an antisymmetric function. The overlap of this distribution with the fundamental fibre mode is zero therefore no light will be launched into the fibre if the fibre is single mode. Since the phase shift is wavelength dependent, the device transmission is wavelength dependent.

A filter of this type was constructed using a fibre beam expander and a 92 $\mu$m thick optically flat plate of glass which was edge polished and mounted on a positioner allowing insertion into the beam in the direction of the arrow (10) and rotation about this axis (11). A maximum extinction greater than 35 dB and a transmission loss of 0.20 dB were observed (using a 1 mm beam diameter). The wavelength period was 54 nm. Tuning through more than a complete wavelength period was accomplished by tilting the plate about the arrowed axis (10) with negligible increase in loss. Polarisation dependence was measured to be less than 0.1 dB.

Figure 2:
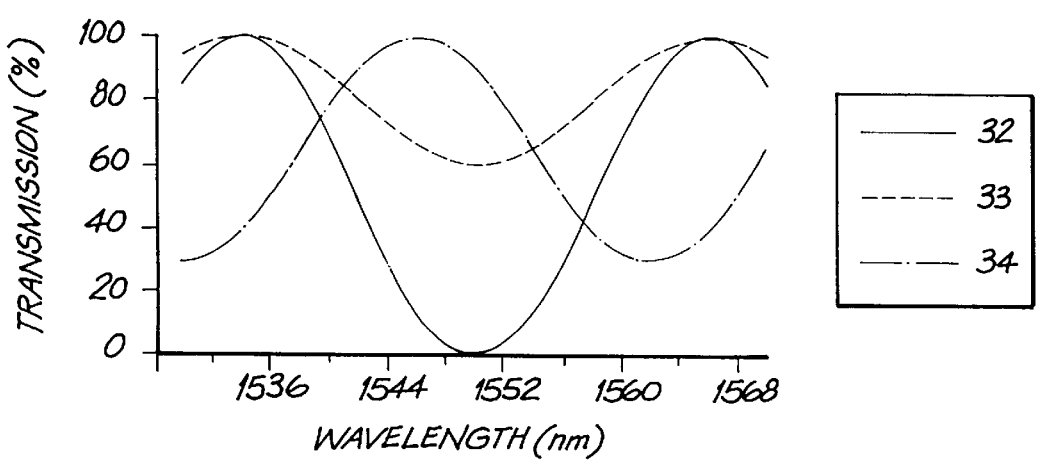
FIG. 2 shows the transmission characteristic of a split-beam Fourier filter with various extinctions and centre wavelengths.

FIG. 2 shows the transmission characteristic of a split-beam Fourier filter with various extinctions and centre wavelengths. All characteristics have a free spectral range (FSR) of 32 nm. The characteristic labelled (32) gives 100% extinction at 1550 nm, the characteristic labelled (33) gives 40% extinction at 1550 nm and the characteristic labelled (34) gives 70% extinction at 1564 nm.

Figure 3:
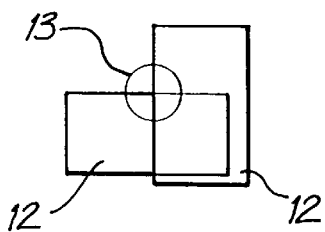
FIG. 3 shows the location of two plates (viewed along beam) to give a combined characteristic.

FIG. 3 shows the location of two plates (12) (viewed along beam (13)) to give a combined characteristic.

Figure 4:
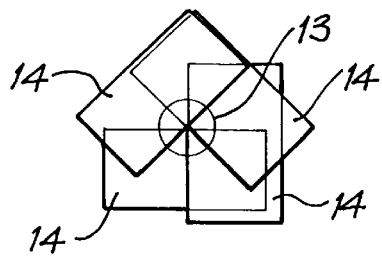
FIG. 4 shows the extension to 4 plates.

FIG. 4 shows the extension to 4 plates (14).

Figure 5:
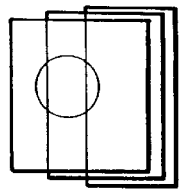
FIG. 5 shows an alternative plate distribution to achieve complex filtering characteristics.

FIG. 5 shows an alternative plate distribution to achieve complex filtering characteristics.

Figure 6:
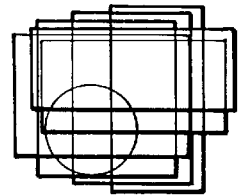
FIG. 6 shows the two dimensional version of FIG. 5.

FIG. 6 shows the two dimensional version of FIG. 5.

Figure 7:
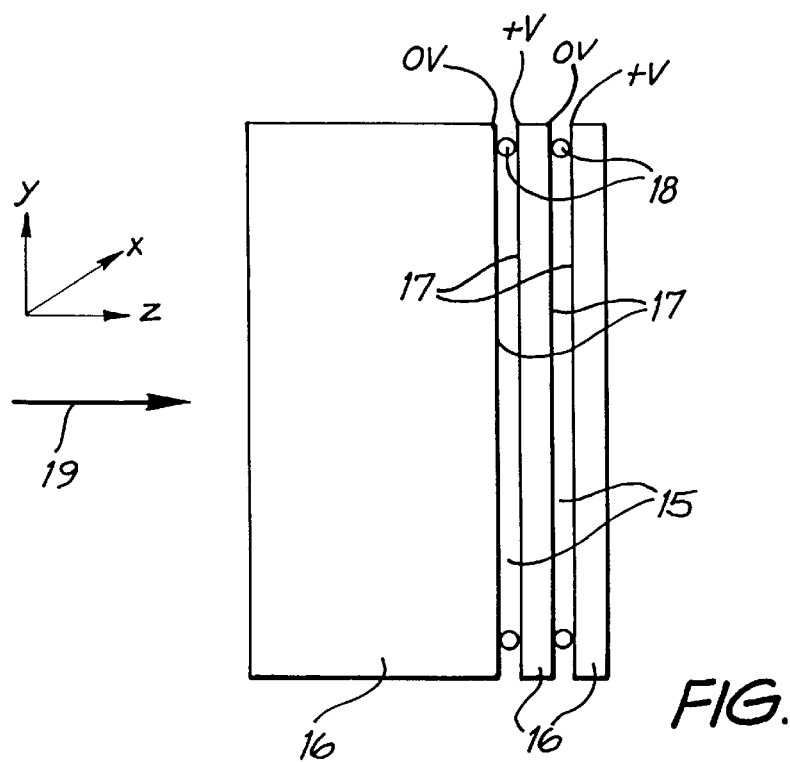
FIG. 7 shows the construction of an electrically tunable phase plate.

FIG. 7 shows the construction of an electrically tunable phase plate. Many means exist for moving the plate in response to an electrical signal (electric stepper motors, piezo-electric positioners etc). In some cases it is more desirable is to fix the element and to achieve electrical tuning without movement. This can be achieved by varying the optical path length of one or both sides of the element in the beam via the electro-optic effect if the element is electro-optic.

For typical electro-optic crystals, this requires a large voltage, however if liquid crystal films are used, a large change in the optical path can be achieved for a moderate voltage (<10 V). FIG. 7 shows a preferred embodiment using two thin layers of liquid crystal (15) to achieve polarisation independent operation. The glass plates (16) are coated with a transparent conducting material (17) (eg Indium Tin Oxide, ITO) and separated by spacers (18) typically 10 µm in thickness. The conducting material is treated such that for no applied field, the liquid crystal in layer 1 aligns along the x axis and in layer 2 aligns along the y axis. Application of an electric field causes the liquid crystal in both layers to align along the z axis resulting in a polarisation independent change in optical path travelled by the beam (19). At an appropriate operating point, the optical path or phase change will be close to linearly dependent on applied voltage.

Figure 8:
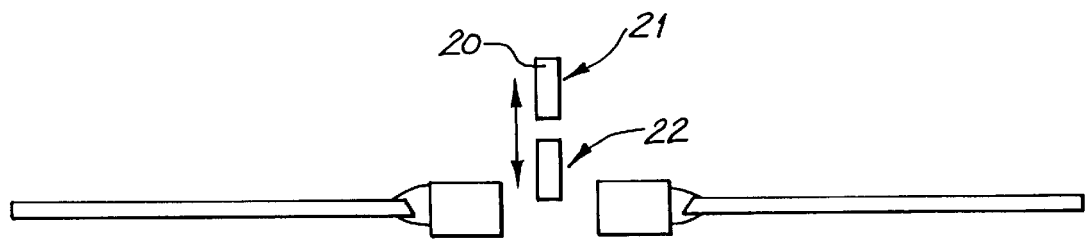
FIG. 8 shows a switchable split-beam Fourier filter.

FIG. 8 shows a single element switchable split-beam Fourier filter. The construction is similar to a standard SBFF but the element (optical flat) (20) can be switched electro-mechanically or otherwise from a position out of the beam (21) to a position in the beam (22), as indicated by the arrow, which gives the required filter characteristics.

Figure 9:
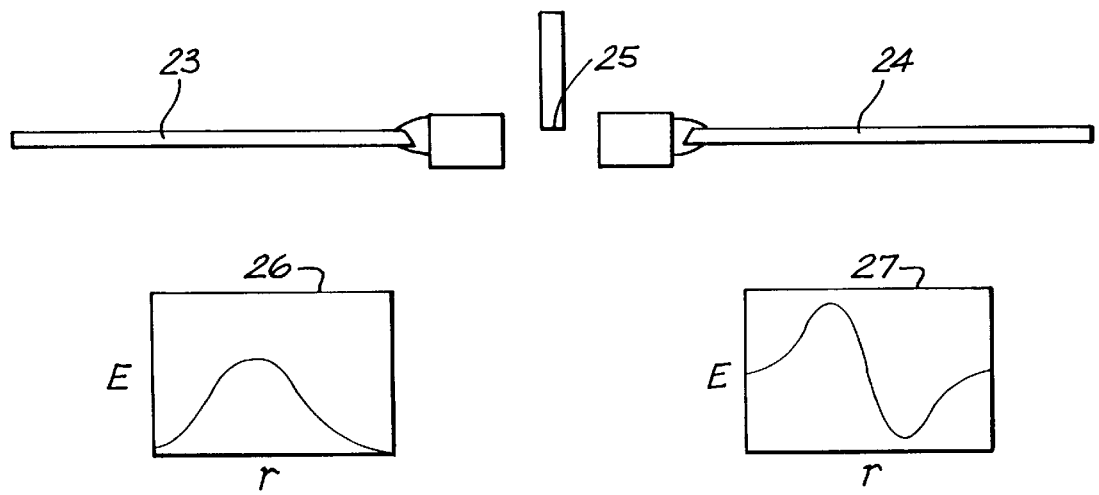
FIG. 9 shows a split-beam mode convertor.

FIG. 9 shows a split-beam mode convertor—the only difference from the SBFF described above being that the fibres (23, 24) support two or more optical modes and the element approximately bisects the beam. If fibre which supports two modes ($LP_{01}$ and $LP_{11}$) is used rather than single mode fibre, an SBFF can be effectively used as a mode convertor (converting power in the $LP_{01}$ mode of the input fibre (23) to power in the $LP_{11}$ mode of the output fibre (24) and vice versa when light enters the device from the opposite direction).

Figure 10:
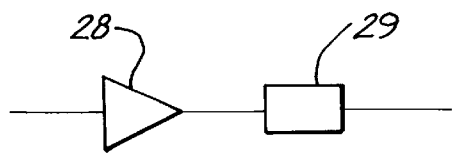
FIG. 10 shows an optical amplifier incorporating a split-beam Fourier filter for gain flattening.

FIG. 10 shows an optical amplifier (28) incorporating a split-beam Fourier filter (29) at the output for gain flattening. The filter can be incorporated at the input or at an intermediate stage within the amplifier.

Figure 11:
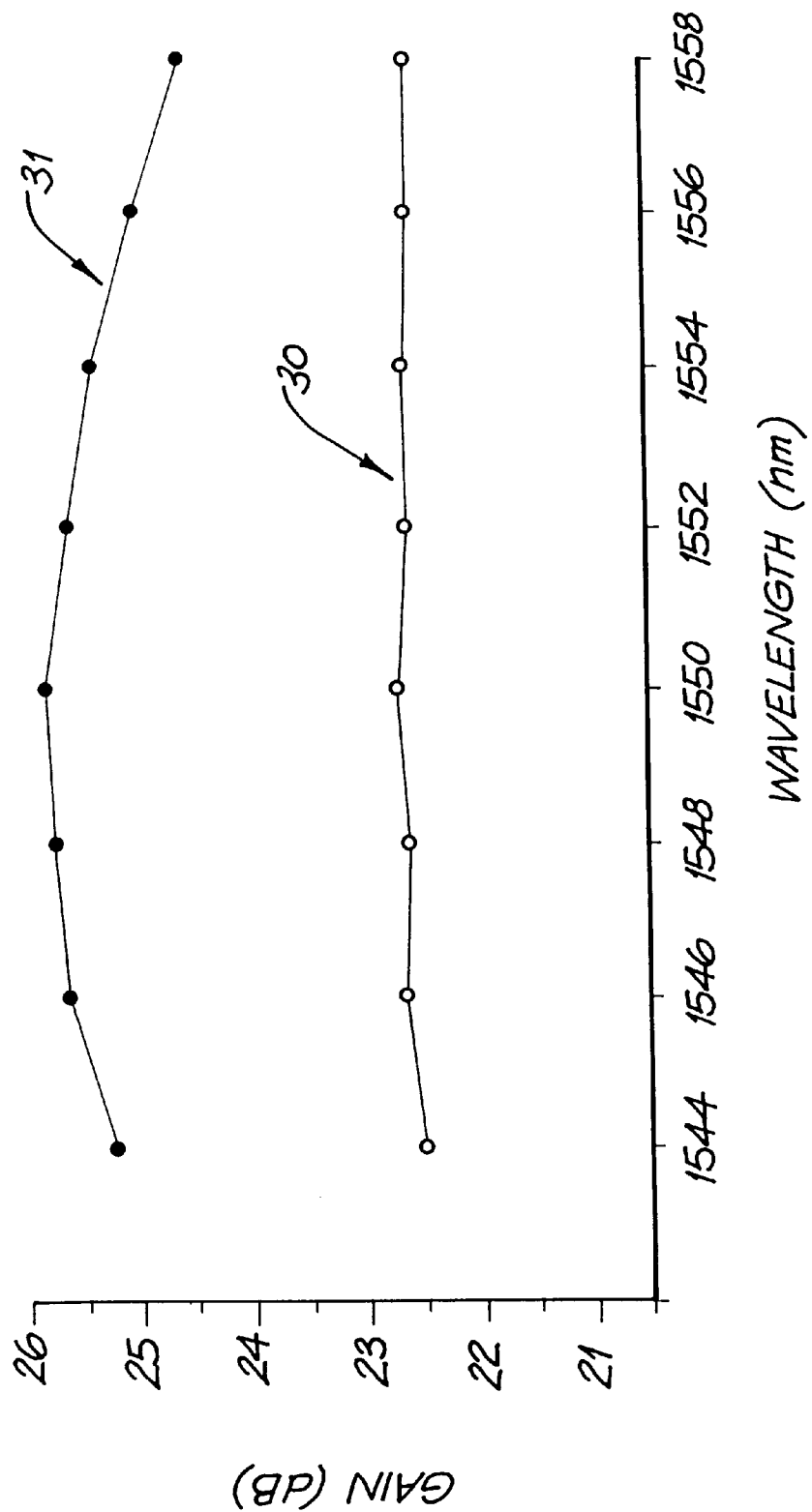
FIG. 11 shows the saturated gain characteristic of an Erbium doped fibre amplifier with and without a split-beam Fourier filter

FIG. 11 shows the saturated gain characteristic of an Erbium doped fibre amplifier with (30) and without (31) a split-beam Fourier filter.

APPLICATIONS

Numerous applications for optical filters exist, and the SBFF is eminently suitable for all fibre applications where a Mach-Zehnder transmission characteristic is required. The following sections describe a number of applications for which the SBFF is ideally suited. This list is however by no means exhaustive.

Filtering: All fibre applications where a Mach-Zehnder transmission characteristic is required.

Gain flattening in Erbium doped fibre amplifiers (EDFAs): An SBFF in series with an EDFA can give an appropriate characteristic for flattening the gain of the EDFA (which is important in wavelength division multiplexed multiamplifier systems) as described above.

Notch Filter in EDFA: The SBFF can be used as a notch filter in a two stage EDFA to attenuate the 1533 nm ASE peak. This gives a greater gain bandwidth product over the entire gain bandwidth of the EDFA and lower noise figure without compromising gain.

Mode convertor: If fibre which supports two modes (LP01 and LP11) is used rather than single mode fibre, an SBFF can be effectively used as a mode convertor (converting power in the LP11 made of the input fibre to power in the LP11 mode of the output fibre and vice versa).

This can be used for a number of applications including:

spatial separation with modal coupler—this is a 3 port device—the transmission from port 1 to port 2 is simply that of the standard SBFF, but the normally rejected power is now routed to port 3 by virtue of the LP11 mode being coupled across to port 3.

dispersion compensation using LP11 mode—it has been proposed and demonstrated [1] that if power is carried in the LP11 mode of a two mode fibre, a large and negative dispersion parameter, D can be achieved suitable for compensating the dispersion of standard single mode fibre when used at 1550 nm wavelength. The SBFF is an ideal device for efficiently converting power from the fundamental mode (LP01) of a single mode input fibre to the LP11 mode of a two mode output fibre. It is also ideal for converting this power back to the fundamental mode of a single mode fibre after compensation.

Sliding/guiding filter: Filters with a cyclic wavelength characteristic have been proposed and demonstrated [2] for long distance multiamplifier transmission of solitons. In these demonstrations, low extinction Fabry-Perot filters were used. The SBFF offers a simpler alternative with improved loss and characteristic control.

Transversal/lattice filter for dispersion compensation and signal processing: Cascaded Mach-Zehnder filters have been proposed and demonstrated for optical signal processing including dispersion compensation [3]. In these demonstrations, an integrated silica waveguide implementation was used. A multiple element SBFF potentially offers greater control and better performance for such devises.

Attenuator: A polarisation independent attenuator can be produced using an SBFF. The centre wavelength of attenuation is the extinction wavelength. The device can be made broadband by using an element which shifts the phase between the two halves by π—this gives a 30 dB bandwidth at about 1% of centre wavelength. Further increases in bandwidth can be achieved using multiple similar elements.

Tunable polarisation dependent attenuator: A tunable polarisation dependent attenuator can be produced using an SBFF in which the optical flat is a half wave plate. In this case when the centre wavelength (wavelength of maximum extinction) of the Mach-Zehnder for light polarised along one axis of the half wave plate is tuned to approximately equal the centre wavelength of the half wave plate, then insertion of this element into the beam attenuates only this polarisation. Such devices can be used for compensating polarisation dependent loss or introducing polarisation dependent loss in optical transmission systems.

Although a number of embodiments have been described in relation to the present invention, it will be apparent to those skilled in the art that the concept of the invention could be applied in various other ways in other embodiments.

REFERENCES

[1] C D Poole et al. "Elliptical core dual mode fibre dispersion compensator" IEEE Phot. Tech. Lett., 5, pp194–197 (1993)

[2] L F Mollenauer et al. "Demonstration, using sliding-frequency guiding filters, of error free soliton transmission over more than 20,000 km at 10 Gbit/s . . . " in Conf. on Opt. Fiber Comm. 1993 (OSA, Washington D.C. 1994) paper PD8, pp37–40

[3] M Kawachi, K Jinguji "Planar lightwave circuits for optical signal processing" in Conf. on Opt. Fiber Comm. 1994 (OSA, Washington D.C. 1994) pp281–282

We claim:

1. An optical filter, comprising a first optical waveguide, a second optical waveguide and means for expanding light from first optical waveguide into a beam, and at least one optical flat inserted partially into the beam so that a fraction of the light passes through each optical flat and a means for focussing the light into the second optical waveguide.

2. The optical filter as claimed in claim 1 in which said first and second waveguide comprise single mode optical fibres.

3. The optical filter, as claimed in claim 1, in which the means for expanding and the means for focussing comprise gradient index lenses.

4. The optical filter, as claimed in claim 1, in which the means for focussing is the means for expanding and an optical reflector is used to allow the beam to pass twice through said means.

5. The optical filter, as claimed in claim 4, where first waveguide and second waveguide are parallel waveguides.

6. The optical filter, as claimed in claim 1, where the first waveguide is the second optical waveguide and the second waveguide is the first waveguide.

7. The optical filter, as claimed in claim 1, in which the optical waveguide is terminated at a non-perpendicular angle and the fibre is offset slightly from the centre of the lens system to reduce backreflection.

8. The optical filter, as claimed in claim 1, in which the optical flat comprises a 30 $\mu$m to 1000 $\mu$m thick polished glass flat, with one edge polished or cleaved approximately perpendicular to the faces, providing the interface between light which passes through the flat and light which doesn't pass throught the flat.

9. The optical filter, as claimed in claim 1, in which the optical flat is antireflection coated to reduce Fabry-Perot resonances.

10. The optical filter, as claimed in claim 1, in which tuning is achieved by varying the angle of one or more optical flats and/or the lateral displacement of one or more plates.

11. The optical filter, as claimed in claim 1, in which a tuning of the waveguide is varied by using a slightly wedged or stepped optical element and varying its position in the beam independently of its lateral displacement into the beam.

12. The optical filter, as claimed in claim 1, in which the tuning is fixed at time of manufacture by setting the angle and position of the optical flat in the beam.

13. The optical filter, as claimed in claim 1, providing decreased temperature sensitivity by use of a material for the flat which has a negative refractive index coefficient with respect to temperature and a positive expansion coefficient with respect to temperature.

14. The optical filter, as claimed in claim 1, in which a non sinusoidal filtering function is achieved by use of two optical flats with approximately parallel interfaces.

15. The optical filter, as claimed in claim 1 in which one or more of the optical flats are can be moved into its or their positions resulting in a switchable filter.

16. The optical filter as claimed in claim 1 where tuning is achieved by varying the optical path through the filter using appropriate electro-optic or magnetooptic materials and varying electric or magnetic fields respectively.

17. A mode convertor comprising a first optical waveguide, a second optical waveguide and means for expanding light from first optical waveguide into a beam, and at least one optical flat inserted partially into the beam so that a fraction of the light passes through each optical flat and a means for focussing the light into the second optical waveguide, the optical waveguide comprising areas for supporting more that one mode.

18. The mode converter as claimed in claim 17 in which the first optical waveguide is single mode and the second optical waveguide supports only the first two optical modes and only one optical flat is used which approximately bisects the beam, and the mode converter comprises means for converting power carried in the fundamental mode of the first waveguide to power in the first higher order mode of the second waveguide and vice versa when used in the opposite direction.

19. An optical attenuator comprising a split-beam Fourier filter comprising a first optical waveguide, a second optical waveguide and means for expanding light from said first optical waveguide into a beam, and at least one optical flat inserted partially into the beam so that a fraction of the light passes through each optical flat and a means for focussing the light into the second optical waveguide, said filter utilising the attenuation at the centre wavelength introduced by the filter.

20. The optical attenuator as claimed in claim 19 in which the device is made to operate over a broad band by using an optical flat with a step which introduces a phase change of $\pi$ radians.

21. A device giving variable polarisation dependent loss comprising a first optical waveguide, a second optical waveguide and means for expanding light from first optical waveguide into a beam, and at least one half wave plate inserted partially into the beam so that a fraction of the light passes through each optical flat and a means for focussing the light into the second optical waveguide.

22. An optical amplifier including a split beam Fourier filter, said filter comprising:

a first optical waveguide;

a second optical waveguide;

means for expanding light from said first optical waveguide into an expanded beam;

at least one optical flat inserted partially into said expanded beam so that a fraction of the light passes through each optical flat; and means for focusing the expanded beam into the second optical waveguide;

wherein said filter is inserted at the input, output or mid-stage of said optical amplifier to provide for gain flattening or gain equalization of said amplifier.

23. The optical amplifier as claimed in claim 22 in which the optical amplifier is an Erbium doped fibre amplifier or a Praseodymium doped fibre amplifier.

24. The optical amplifier as claimed in claim 23 in which the split beam Fourier filter is switchable so that the amplifier can be switched from being optimised for gain flatness to being optimised for output power.

* * * * *

UNITED STATES PATENT AND TRADEMARK OFFICE
CERTIFICATE OF CORRECTION

PATENT NO. : 5,930,441
DATED : July 27, 1999
INVENTOR(S) : Ralph Alexander Betts, et al.

It is certified that error appears in the above-identified patent and that said Letters Patent is hereby corrected as shown below:

Claim 2, Column 5,
Line 37, replace "second waveguide" with "second waveguides"

Claim 11, Column 6,
Line 2, replace "waveguide" with "wavelength"

Claim 16, Column 6,
Line 20, replace "in claim 1" with "in claim 11"

Signed and Sealed this

Second Day of October, 2001

Attest:

*Nicholas P. Godici*

NICHOLAS P. GODICI
*Attesting Officer*     *Acting Director of the United States Patent and Trademark Office*